US011477068B2

(12) United States Patent
Smith et al.

(10) Patent No.: US 11,477,068 B2
(45) Date of Patent: Oct. 18, 2022

(54) DATA NETWORK NOTIFICATION BAR USER INTERFACE

(71) Applicant: Kaseya Limited, Dublin (IE)

(72) Inventors: Ryan Smith, San Clemente, CA (US); Chad Gniffke, Costa Mesa, CA (US); Robert Wendell Davis, Half Moon Bay, CA (US); Mark Thomas Lingen, Woodinville, WA (US); Mark James Sutherland, Milpitas, CA (US)

(73) Assignee: Kaseya Limited, Dublin (IE)

( * ) Notice: Subject to any disclaimer, the term of this patent is extended or adjusted under 35 U.S.C. 154(b) by 209 days.

(21) Appl. No.: 13/628,901

(22) Filed: Sep. 27, 2012

(65) Prior Publication Data

US 2014/0089848 A1 Mar. 27, 2014

(51) Int. Cl.
*H04L 41/0604* (2022.01)
*H04L 67/147* (2022.01)
*G06Q 10/06* (2012.01)
*H04L 51/224* (2022.01)
*H04L 67/1095* (2022.01)

(52) U.S. Cl.
CPC ......... *H04L 41/0609* (2013.01); *G06Q 10/06* (2013.01); *H04L 51/224* (2022.05); *H04L 67/1095* (2013.01); *H04L 67/147* (2013.01)

(58) Field of Classification Search
CPC ... H04L 41/0609; H04L 41/0604–0627; H04L 12/587; H04L 41/24; H04L 41/22; H04L 41/06–0695; H04L 43/0823; H04L 51/24; H04L 67/1095; H04L 67/147; H04L 51/224; G06Q 30/016; G06Q 10/06; G06F 3/048–04897; G06F 11/30–3696; G06F 11/327; G06F 8/34; G05B 19/418; Y10S 715/965–97
USPC .......................................... 715/808
See application file for complete search history.

(56) References Cited

U.S. PATENT DOCUMENTS

| | | | |
|---|---|---|---|
| 5,999,179 A * | 12/1999 | Kekic | H04L 41/0213 715/734 |
| 6,356,633 B1 * | 3/2002 | Armstrong | 379/265.11 |
| 7,357,301 B1 * | 4/2008 | Bajpay | G06Q 10/10 235/376 |
| 7,506,048 B1 * | 3/2009 | Motoyama | H04L 41/022 709/217 |

(Continued)

OTHER PUBLICATIONS

"Zabbix 1.8 Documentation". Zabbix, Nov. 22, 2009. Web. May 4, 2016. <https://www.zabbix.com/documentation/1.8/manual>.*

(Continued)

*Primary Examiner* — Liang Y Li
(74) *Attorney, Agent, or Firm* — Maschoff Brennan

(57) ABSTRACT

A method and apparatus are disclosed of providing a user application with a notification message. One example method may include receiving a notification message and identifying a predetermined category of a notification bar portion of the user application to display the notification message. The method may also include associating the notification message with the identified predetermined category and determining a level of importance of the notification message. The method may also provide displaying a notification indicator on the notification bar according to the predetermined category and to the notification type that corresponds to the level of importance.

13 Claims, 5 Drawing Sheets

(56) References Cited

U.S. PATENT DOCUMENTS

| | | | | |
|---|---|---|---|---|
| 7,552,200 | B2* | 6/2009 | Dodrill et al. | 709/219 |
| 7,975,015 | B2* | 7/2011 | Horvitz | G06Q 10/107 |
| | | | | 709/203 |
| 8,645,856 | B1 | 2/2014 | Burr et al. | |
| 9,485,312 | B2 | 11/2016 | Gniffke et al. | |
| 9,769,264 | B2 | 9/2017 | Gniffke et al. | |
| 2002/0107958 | A1* | 8/2002 | Faraldo, II | H04L 41/00 |
| | | | | 709/224 |
| 2003/0023722 | A1* | 1/2003 | Vinberg | G06F 3/0481 |
| | | | | 709/224 |
| 2004/0143636 | A1* | 7/2004 | Horvitz | G05B 19/404 |
| | | | | 709/207 |
| 2005/0039135 | A1 | 2/2005 | Othmer et al. | |
| 2005/0235251 | A1* | 10/2005 | Arend et al. | 717/104 |
| 2007/0210908 | A1* | 9/2007 | Putterman | G08B 27/006 |
| | | | | 340/506 |
| 2009/0089381 | A1* | 4/2009 | Anderson | G06Q 10/107 |
| | | | | 709/206 |
| 2009/0125602 | A1* | 5/2009 | Bhatia et al. | 709/207 |
| 2009/0125917 | A1* | 5/2009 | Parker et al. | 719/318 |
| 2010/0017367 | A1* | 1/2010 | Nurmi | 707/3 |
| 2010/0064039 | A9 | 8/2010 | Ginter et al. | |
| 2010/0274366 | A1 | 10/2010 | Fata et al. | |
| 2010/0277307 | A1* | 11/2010 | Horton et al. | 340/539.11 |
| 2011/0099500 | A1* | 4/2011 | Smith | G06F 3/0482 |
| | | | | 715/771 |
| 2011/0118578 | A1* | 5/2011 | Timmerman | A61B 5/4839 |
| | | | | 604/890.1 |
| 2011/0154241 | A1* | 6/2011 | Skidmore | G06F 3/0484 |
| | | | | 715/771 |
| 2011/0239228 | A1 | 9/2011 | Grigsby et al. | |
| 2012/0158421 | A1* | 6/2012 | Dove et al. | 705/2 |
| 2012/0222002 | A1 | 8/2012 | Harrison | |
| 2012/0284278 | A1* | 11/2012 | Ikegami | H04L 43/0817 |
| | | | | 707/741 |
| 2013/0031238 | A1* | 1/2013 | Grossklas | H04L 43/0817 |
| | | | | 709/224 |
| 2013/0054706 | A1 | 2/2013 | Graham et al. | |
| 2013/0145303 | A1* | 6/2013 | Prakash et al. | 715/779 |
| 2013/0198358 | A1* | 8/2013 | Taylor | H04L 41/0213 |
| | | | | 709/223 |
| 2014/0089099 | A1 | 3/2014 | Money | |

OTHER PUBLICATIONS

SolarWinds, Log and Event Manager, Jul. 15, 2012. http://web.archive.org/web/20120715193814/http://www.solarwinds.com/documentation/LEM/Docs/LEMUserGuide.pdf (Year: 2012).*

SolarWindsInc, How to Create Filters in Your SolarWinds LEM Console, Aug. 23, 2011. https://www.youtube.com/watch?v=Zdp3xsAvVFA (Year: 2011).*

John Papa, Simple JavaScript Notifications with toastr, Apr. 3, 2012. https://johnpapa.net/toastr100beta/ (Year: 2012).*

Lefort, Jean-Yves. "Mail Notification". Mar. 9, 2012. NonGnu.org. <https://www.nongnu.org/mailnotify> (Year: 2012).*

Campbell, D., "Service Oriented Database Architecture: App Server-Lite?" (Jul. 14-16, 2005), Proceedings of the 2005 ACM SIGMOD international conference on Management of Data, pp. 857-862 [retrieved from http://dl.acm.org/citation.cfm?id=1066267].

Microsoft, "Create Queue (Transact-SOL)" (2014), pp. 1-5 [retrieved from http://technet.microsoft.com/en-us/library/ms 190495( d=printer, V=sql.90). aspx].

Microsoft, "Stock Sample" (Jul. 17, 2006), pp. 1-5 [retrieved from http://msdn.microsoft.com/en-US/library/ms160739(d=printer,v=sql.90).aspx].

Perrine, R., "Implementing ITIL with Kaseya Tools" (Feb. 16, 2011), pp. 1-16 [retrieved from http://resourcelibrary.treasuryandrisk.com/content12028].

Rankins, R.; Bertucci, P.; Gallelli, C.; Silverstein, A., "Microsoft SOL Server 2005 Unleashed" (2007), Sams Publishing, pp. 1-1939 [retrieved from http://techbus.safaribooksonline.com/book/databases/microsoft-sql-server/0672328240].

* cited by examiner

DATA NETWORK NOTIFICATION BAR USER INTERFACE

TECHNICAL FIELD OF THE INVENTION

The present invention is generally related to a status bar in a graphical user interface, and more particularly, to a status bar with various notification options and menus updated based on corresponding data network operations.

BACKGROUND OF THE INVENTION

Conventionally, status information made available to users of applications operating on a computing device within a data network environment is limited in its accessibility and its current status functions. For example, it is difficult for users to know which areas of a virtual computing environment or virtual systems administrator (VSA) require attention or service updates at all times. Because the functionality of the VSA is comprehensive (i.e., computer agents, mobile agents, tickets, alarms, server updates, updates, etc.) a user could be problem solving in one area or portion of an application interface and not realize that their attention is required in another area of the application.

According to one conventional example of operation, if a user is working as an administrator handling customer work order "tickets" (i.e., known problems), the application interface would generally not offer any indicators that would prompt the user of recent updates, such as mail messages recently received, current server updates, and/or other alarms or notifications that could be detrimental if not expedited immediately. For instance, the user may have navigated to a less common interface page of an application in order to process a customer ticket while failing to notice important incoming mail or recent alerts that may be more important requiring immediate attention. In practicality, users are constantly switching between navigation items, checking messages, tickets, alarms, etc., which may be slow moving and inefficient. Alternatively, the users are simply ignoring items that may be important in the other areas of the application as they continue to work on one area (i.e., customer tickets).

SUMMARY OF THE INVENTION

One example embodiment of the present invention may include a method of providing a user application with a notification message. The method may include receiving a notification message and identifying a predetermined category of a notification bar portion of the user application to display the notification message. The method may also include associating the notification message with the identified predetermined category and determining a level of importance of the notification message. The method may further include displaying a notification indicator on the notification bar according to the predetermined category and to at least one notification type that corresponds to the level of importance.

Another example embodiment of the present invention may include an apparatus configured to provide a user application with a notification message. The apparatus may include a memory configured to store predetermined categories of a notification bar and a receiver configured to receive a notification message. The apparatus may also include a processor configured to identify a predetermined category of the notification bar portion of the user application to display the notification message based on the predetermined categories of the notification bar, associate the notification message with the identified predetermined category, determine a level of importance of the notification message, and display a notification indicator on the notification bar according to the predetermined category and to at least one notification type that corresponds to the level of importance.

DETAILED DESCRIPTION

Example embodiments provide a notification bar that updates and provides related information that may be used to keep the user informed of data network changes and updates. The present information technology (IT) systems management application may provide notification bar information to a user interface in a simple and efficient manner. For example purposes, a procedure may include a set of automated tasks to be scheduled and executed on a managed device (client) or on a management server, as part of a service desk effort (i.e., ticket workflows). The notifications may be created/edited within a virtual system administrator (VSA) application and stored on a server in a ticket processing queue.

Figure 1:
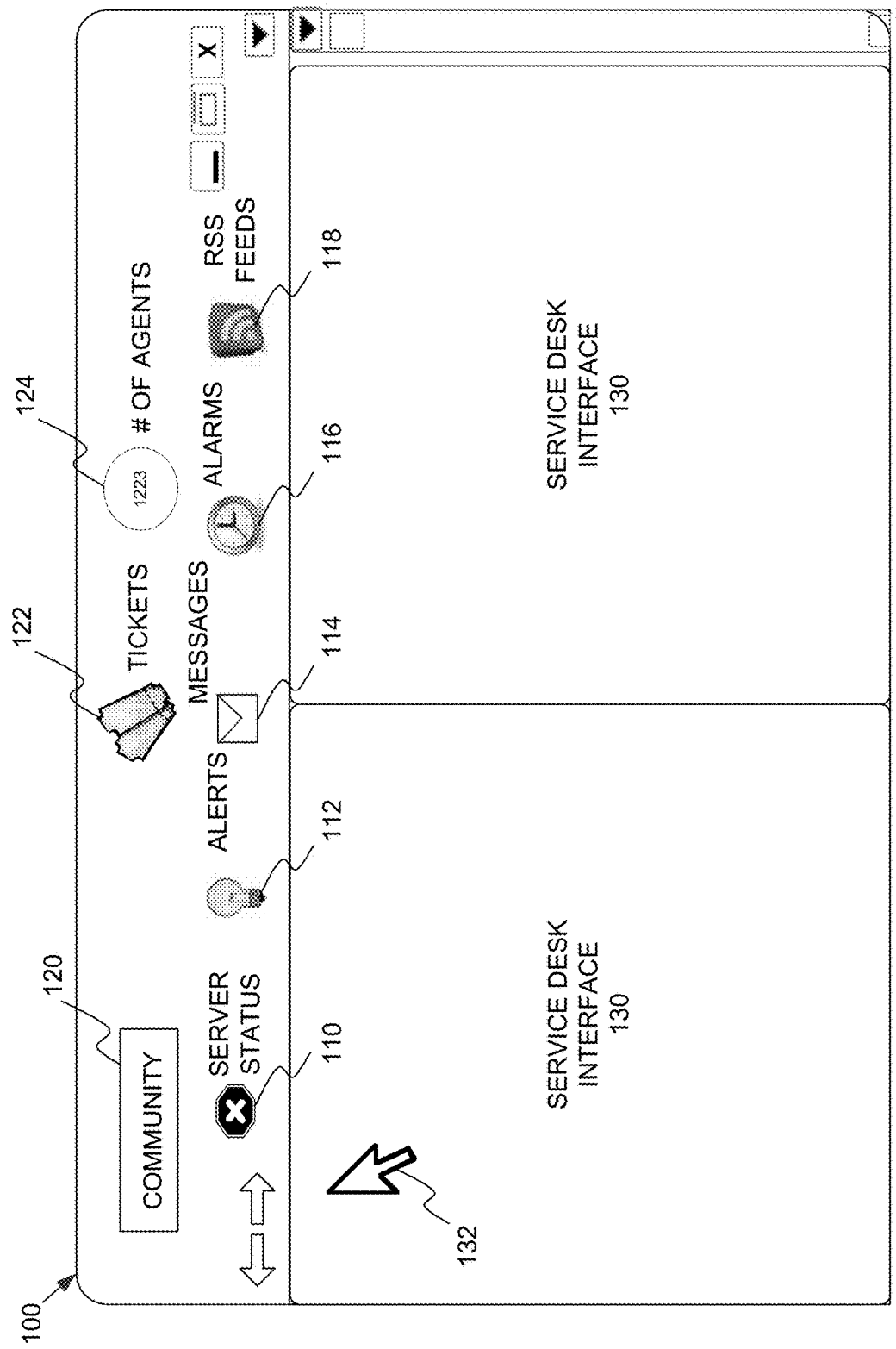
FIG. 1 illustrates an example graphical user interface (GUI) of a notification bar according to example embodiments.

FIG. 1 illustrates an example GUI of a notification bar interface 100 according to example embodiments. Referring to FIG. 1, a notifications bar interface 100 may include various different identifiers and/or icons used to provide dynamic notifications/indications to the user as they become available. The notifications bar provides notifications and access to various administrative items described in detail below. For example, the notifications bar may be populated with a list of items that represent different types of problems, information sources, updates and other useful information needed to help the administrator perform his or her tasks.

The notification bar may have different "categories" of items. For example, the server status 110 may display the status of the server if there is current problem (i.e., server maintenance, server overloaded, server malfunction, server license expired, etc.). An "X" or red stop sign may appear and/or flash when any of the various conditions occurs, or the server may provide a green light indicator when everything is working as expected.

An intelligence message indicator may be represented by a light bulb 112. This type of message will replace the pop-up messages that would normally occur during the login process or other related processes and instead add additional messages which may be listed and accessed when the user performs a hover over operation with the cursor 132. Example messages may include but are not limited to a 'welcome' message for first time users, a server is severely overloaded, a server has reached maximum licenses, a SQL server has tracing enabled, a SQL server and regular server clocks are in sync, heavy logging is enabled in presentation services, too many scripts are scheduled at the same time, auto update in patch management is schedule to run at the same time, server scripts are not being run properly, local host access is not enabled, database size is reaching its size limit, master and subscriber databases have the same collation, ensure exchange server is not operating on the same server as the VSA, the database backup location should have 2× current database size to perform backup, SQL server should use less than 80% of physical memory, performance of audit can be improved with indexes, 'WebExec' function should be running, if any alarms are suspended on any agents, no agent is installed on the machine that you are currently logging in from, "would you like to install now?", an agent has detected a network that hasn't been scanned by the server, "would you like to scan it now?", etc.

The mail icon 114 may represent messages that are presented to the user to display new messages that the user has received through an information center 'inbox'. Certain generated "tickets" 122 may be used to display tickets that the user has selected via filters in the ticket configuration. The tickets may represent information that the user has customized to receive. The user can pick the desk, assignee, status, stage, and category to determine which tickets are important. Whenever a ticket is created or changed to meet the filter criteria, a notification will be sent to the user.

A computer agent status 124 may be used to display the online and offline count of agents to the user so they know the current status of their managed agents (i.e., accounts managed). Alarms 116 may be used to collect all the alarms that the user would want to see and notify them that alarms are maturing on certain agents. This can be configured by setting up a filter on the notification item or by configuring the alarm to provide a notification. The alarm could provide the notification, or the notification item could check all alarms to determine whether it should notify the user.

The RSS reader 118 displays the feed from whatever URL(s) are provided. A default feed will be the server community blog, however any feed (i.e., ESPN, CNN, Slashdot, etc.) can be used. This may be different from other RSS readers that keep track of which items have already been read. This RSS reader 118 displays the current feed, but could be customized to also include previous content feeds. The community icon 120 may provide access to an internal blog or wiki that represents discussions posted by other users or agent devices. The service desk interface 130 represents a portion of desktop used by the user that is uninterrupted by the various notifications of the notification toolbar 100. Regardless of the present workspace being implemented by the user, the notification toolbar 100 may operate alongside and independently of a present workspace.

The various indicators used may incorporate different styles of notification types. For example, there are three types of notifications (e.g., silent, subtle and flyout). The different notification types are similar in some ways to the different kinds of notifications that appear on a smartphone device. For example, you could have an icon be displayed on the top (silent), you could have the phone play a sound and vibrate (subtle), and flyout would be the equivalent of your phone ringing and ringing until the user accessed the phone similar to an alarm clock. The user application that includes the notification bar may be operated on any computing device. The device may be a computer, laptop, mobile, wireless or cellular phone, a PDA, a tablet, a client a server or any device that contains a processor and/or memory, whether that processor or memory performs a function related to an embodiment of the invention.

Figure 2:
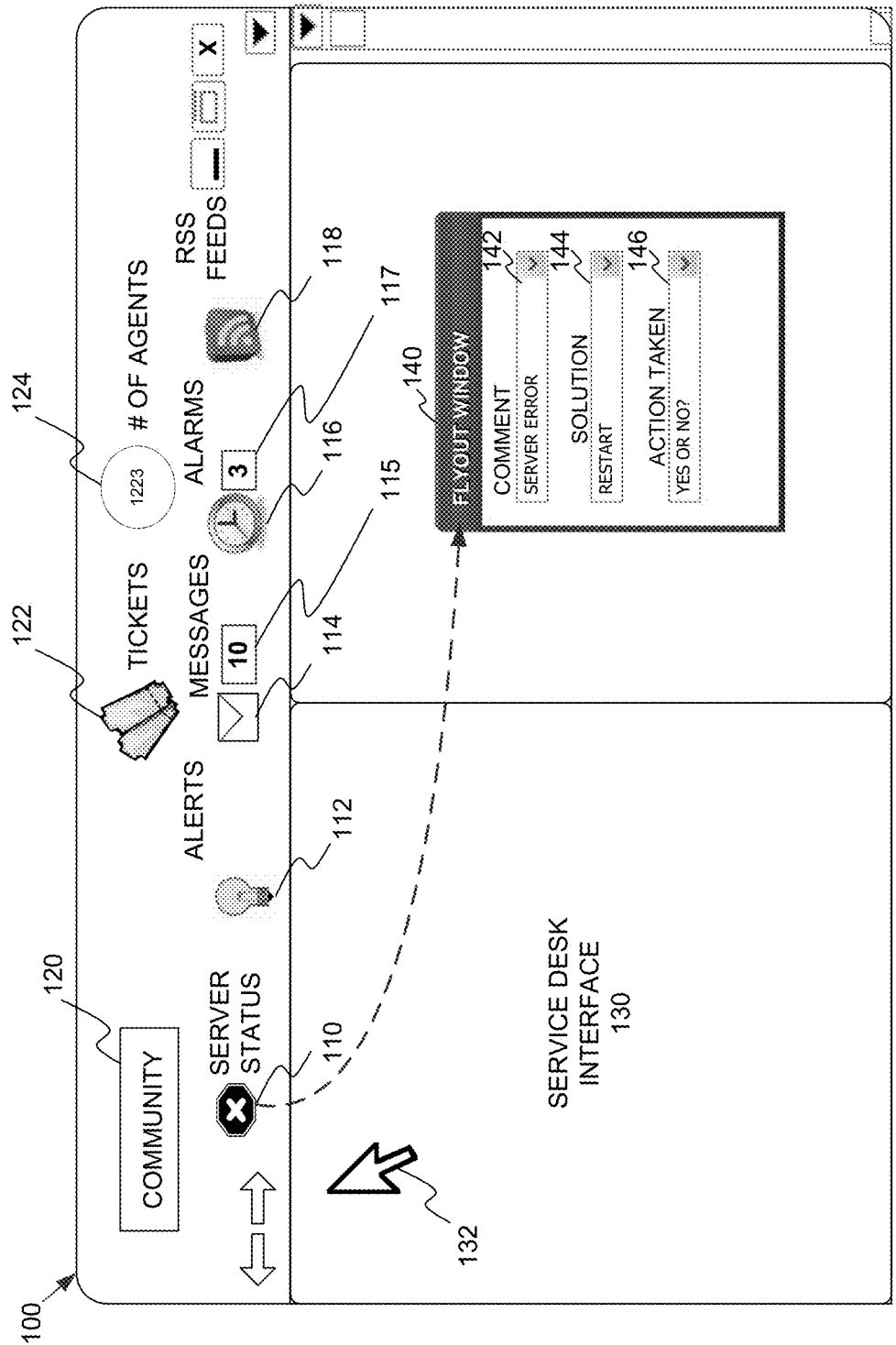
FIG. 2 illustrates an example GUI of a notification bar with a corresponding 'flyout' notification message according to example embodiments.

FIG. 2 illustrates additional details and functions of the notification bar interface. According to a first example notification type, a silent notification may provide a number next to the icon which will change depending on how many notifications are waiting. For example, FIG. 2 provides an indicator for "10" messages 115 next to mail icon or "3" messages 117 next to the alarm icon. Clicking on the item icon 114 or number indicator 115 will expand the notification item and provide a list of the 10 items that can be dismissed individually by clicking on an "X" for the item or dismissed altogether by clicking the "clear all" button at the bottom of the dropdown menu (not shown).

According to a second example notification type, a subtle notification may provide a number and a flashing indicator next to the icon, which will also flash to get your attention for a predefined period of time (i.e., 30 seconds, 2 minutes, 5 minutes, etc.). After the predefined time period has lapsed, the flashing will stop or until another notification is received, and then the flashing will resume for another predefined time interval. This subtle indicator provides a way to get the user's attention so that they don't miss a notification that has arrived.

According to yet another example notification type, a pop-up or flyout notification may be used to grab the attention of the user in the event of a more important notification. For example, server status messages and intelligence messages may be among elevated levels of importance and must be shared with the user as they are discovered and not when the user decides to check the notification statuses. A user may also specify which items are important based on a particular notification category, a notification timeframe and/or other user specified notification criteria. The notification items which are designated as "important" may automatically open as though the user clicked on them. An important or "flyout" type of message may invoke a corresponding "flyout" window that will display the notification item.

FIG. 2 illustrates an example flyout window 140 which is invoked in the event of an important error message or system change that the user should be aware of its occurrence. In this example, the flyout window 140 includes a comment section 142 "server error", a solution section "system restart" 144 and a corresponding feedback section "yes or no?" 146 where the user may decide to take action and restart the server. Alternatively, an important action, such as "system error" may invoke an automated action option that initiates an action automatically after a predetermined period of time has elapsed (i.e., restart server). The flyout notification may be accompanied by a loud noise, flashing indicators, etc., so a user may be well informed of an important error while performing their own work functions in the service desk interface 130. For example, a flyout message may provide an indication that a new agent has not been installed on the user's machine and a corresponding button to install an agent now.

According to one example method of operation, the user may have configured a mail message notification to notify them when a new message has arrived in their information center inbox. They see the mail notification item at the top of their window with a "0" next to the icon. Now, assuming a message has been sent to the user, which causes that number to change from a "0" to a "1." A silent notification may provide the user with a mere number change from a "0" to a "1." No other notification will be provided in the case of a silent notification. If the user is watching the indicator then he or she will notice the change, otherwise the indication will not be detectable in the example of a silent notification.

According to another example, a subtle indicator may provide the user with a displayed number change from a "0" to a "1", and the item itself will "flash" or "blink" to get the user's attention. Clicking on the item will stop the flashing from continuing because such an action acknowledges that the user has seen the notification. According to yet another example, a flyout indicator provides the user with a pop-up window that automatically opens and displays the details of the message that has just arrived. The user may then observe the sender and the subject of the email, and can dismiss the item by clicking the "X" on the message, or by clicking on the notification item which will cause the flyout display dialog to close but not remove the notification.

In another example, the notification bar may be hidden when no notifications are present. Also, if there are no present notifications, then the item will not be displayed on the top of the user interface. If the user selects this option, the item would not show a "0" next to it, and instead it would be hidden and when the item changes from "0" to "1", the user would then see the item with whichever notification was selected for this particular indicator category (e.g., silent, subtle, flyout).

According to one example, the user's server may crash or become inoperable while they are actively working on a particular application. In this case, a flyout response may indicate that the user cannot change the notification of this message and so the icon is displayed on the top left of the screen while the flyout is opened to command the user's attention. If the problem is resolved on its own, the notification will automatically be removed, but the user can close the flyout window by clicking on the item. The icon will not go away until the problem is resolved.

According to an active operation example, a user may be handling customer tickets in a ticketing portion of a user application interface. In operating in such an environment, the messages may be arriving into the user's inbox, and they would otherwise be unaware of any of those incoming messages. While the user is processing customer complaints or questions via a ticket system, the user can observe messages without navigating away from the present work area of the application interface.

According to another example, when a user first logs into the application, they may be able to observe that their machine does not have a particular agent installed. Once the agent is installed on their machine, then the VSA can scan their network to discover other devices that might need agents or management. The agent allows the device to be managed remotely. For a new Windows user, there is a notification that would teach them how to use the application system. For example, a message may be provided to the user indicating that "You currently are not connected to the Internet, we've found wireless networks, would you like to connect to a wireless network?." These messages would guide a first time user through using the application and how to connect to a wireless network. Once a user is familiar with the application tools and help menus, the notifications may be turned off.

According to another example, the first time a user executes a particular application (i.e., photo application), a message may be returned indicating certain dialog that assists the user with common features unaware to the user of the application. First time users may be provided the opportunity to access those messages or notifications and see what the photo application product does while it is being used. Experienced users may opt-out of the notifications by selecting a checkbox that says "don't show me these messages again."

In the above-noted examples, an administrator may be working on customer 'tickets' diligently trying to resolve customer service issues. The busy administrator may fail to observe important notifications given the lack of a notification bar. However, a ticket worker would generally not be concerned with a bandwidth problem or alarm which would be handled by a different department. One example might arise when an administrator is working one current issue on behalf of a client or customer (i.e., a first ticket) when another ticket arrives in the administrator's inbox or ticket counter and needs to be dealt with immediately (i.e., important matter). In this case, the administrator may be too busy to observe the new ticket, and therefore it may be unanswered until the current ticket is resolved. The notification bar 100 according to example embodiments may provide an on-going display of updated tickets and other notifications so an administrator may keep up-to-date with such old and new problems as they arise. By alerting the administrator with messages/tickets/notifications in the system, the user may be notified when there is something that requires his or her attention.

According to another example embodiment of the present invention, an administrator may be operating in some area of the application, when an important message appears into their inbox 114 regarding a high priority item. A filtering function applied to the notification bar may identify the important message as an alert. The filter may parse the message for important words, such as "important", "urgent", "[username: "president"]", and then elevate the message's status from normal to important. As a result of the message's elevated status, the message may be automatically associated with a different notification bar type or icon than what was previously assigned. For example, if a ticket was issued from a computer IP address or name associated with a president of the corporation, the parser/filter function will identify the president by the information associated with his or her computing device and elevate his or her ticket from "ticket" status 122 to an automatic "alert" status 112 or emergency status.

Messages may be assigned a severity indicator or level of importance by the source reporting the problem. If the server is down or another urgent matter is present on the network, a severity of "1" may be assigned to the problem. Thereafter, escalation rules may be set in place from the service desk, which will send notifications to the appropriate computers, devices, etc., associated with the correct departments and people. According to one example, the notification bar 100 permits a user to configure a notification to be enacted whenever a severity "1" ticket is presented in their queue of notifications. The severity "1" ticket may move to the top of the queue instead of just being a number of tickets or messages "10" as illustrated in FIG. 2. In order to notify the user based on their preference (e.g., silent, subtle, flyout), a user preference may be setup to have the specific types or severities of notifications provided to the user according to the user preferences. Certain users may have certain responsibilities, so a flyout notification for server errors, although disruptive, may be a preferred type of notification for a user operating their computing device while being responsible for maintaining a server's operation.

In operation, each of the notification icons and preferences are components that feed into the notification bar 100, which determines if anyone should be notified. A determination is performed by observing the incoming message (e.g., inbox, ticket, alert, etc.) and looking through each of the notification items registered by users and determines if they match. So if user 'A' has a filter setup for tickets that are assigned to him with a severity of critical, and a ticket that matches those criteria are pushed via a push communication protocol to the notification system, then the ticket and the notification item are linked and the user may observe the notification on their GUI. This determination is performed for each user, and it is possible that multiple individuals are configured to observe the same ticket/notification. In fact, a single ticket may trigger multiple notifications for a particular user if they have configured their notification items to overlap.

Identifying which icon to assign to incoming messages may be based on a number of different criteria and operations. As illustrated in FIGS. 1 and 2, there are various icons 110-124. Each of these icon types may be paired with a particular notification. For example, a ticket will not be transmitted to an inbox notification since a first check in the "matching" operation of "events" to notification items would yield a resulting icon of tickets or more important notification icons (i.e., alerts). An event such as "ticket created" may be sent to the notification system, where all the user notifications of type 'ticket' may be identified. Next, each of the notification items related to tickets may be identified to check their additional filter features to determine if they should be linked to the notification bar of the user. In the example of an inbox message, the message notification items for a particular user may be observed, which may include identifying the message by type and by user. The message may then be linked to the new inbox message, and the user is notified of the new message.

Figure 3:
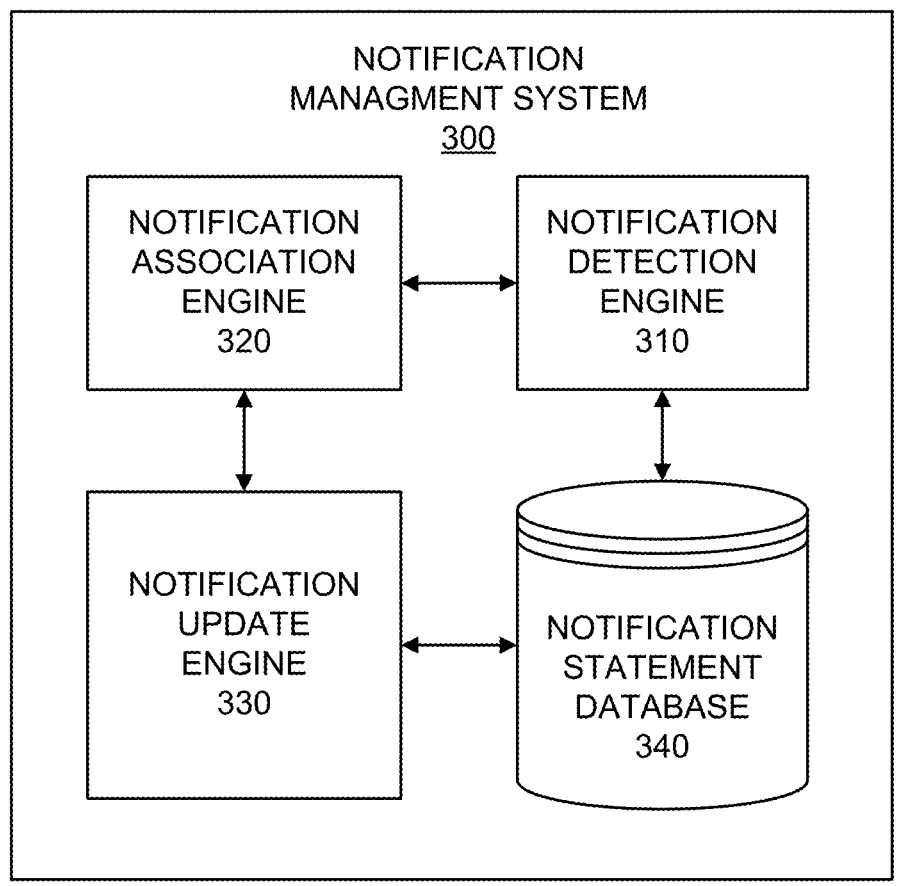
FIG. 3 illustrates an example notification system according to example embodiments.

FIG. 3 illustrates an example notification management system 300, according to example embodiments. Referring to FIG. 3, the notification management system 300 may provide a user application that operates with notification messages. In operation, the system may receive a notification message by the user application that is destined for one or more users operating the user application on their computing devices. The notification may be received and identified by a notification detection engine 310. The received notification may be identified as being part of a predetermined category based on one or more notification statements stored in a statement database 340. The predetermined categories may be linked to one or more portions of a notification bar, which is a portion of the user application. The notification association engine 320 may identify the received notification as being best suited to be displayed as a particular notification message category and may associate the notification message with the identified predetermined category, such as an icon or display emblem. A level of importance of the notification message may be determined based on one or word identification operations used to identify contents of the notification and whether it should be elevated to a higher level of importance or urgency. The notification may also be provided to the user notification bar based on one or more user preferences. A final display operation may utilize one or more notification importance operations and/or user preference operations to display a notification indicator on the notification bar according to the predetermined category and to at least one notification type that corresponds to the level of importance by the notification update engine 330.

According to example embodiments, the predetermined category identified in the notification statement database 340 may correspond to a category name and display icon of the notification bar, such as a type of urgency icon or user preferred icon on the display notification bar. Also, a noise (i.e., sound alert) or dynamic display function (i.e., flashing) may also be incorporated into the notification bar display function depending on the user preferences. The category name and display icon may be subjectively related to content of the notification message. The notification type may include one or more of a silent notification, a subtle notification and a flyout notification. The silent notification does not produce any sounds and the subtle notification may produce at least one sound if configured by the user based on predefined user preferences. The flyout notification may be displayed via a new window based on the notification indicator, the new window may maintain an alert message for a predetermined period of time.

In order to determine an importance of the notification message, the words or strings in the notification message may be parsed to identify at least one word from the notification message that is used to select a predetermined category of the notification bar (e.g., important, unimportant, urgent, etc.) and a notification type used to display the notification message on the user application. The contents of the message are parsed to match an association of word meanings to importance and category types so that the notification bar can display the notification in the correct category and with the correct level of importance.

Example embodiments are preferably realized in a hardware device, such as, a server, computer, cellular phone, or other mobile terminal device etc. In other embodiments, the present invention may be realized in hardware, software, firmware or a combination of hardware, software and/or firmware. The above example embodiments may also be implemented in software code and may be stored on a computer readable medium, such as, for example, non-volatile memory devices (e.g., RAM, ROM, hard disk etc.). The software code may be accessed from a non-transitory computer readable medium and may be executed by a processor. The executed program may provide one or more of the features of the example embodiments. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 4 illustrates an example network element 400, which may represent any of the above-described network components of the other figures.

Figure 4:
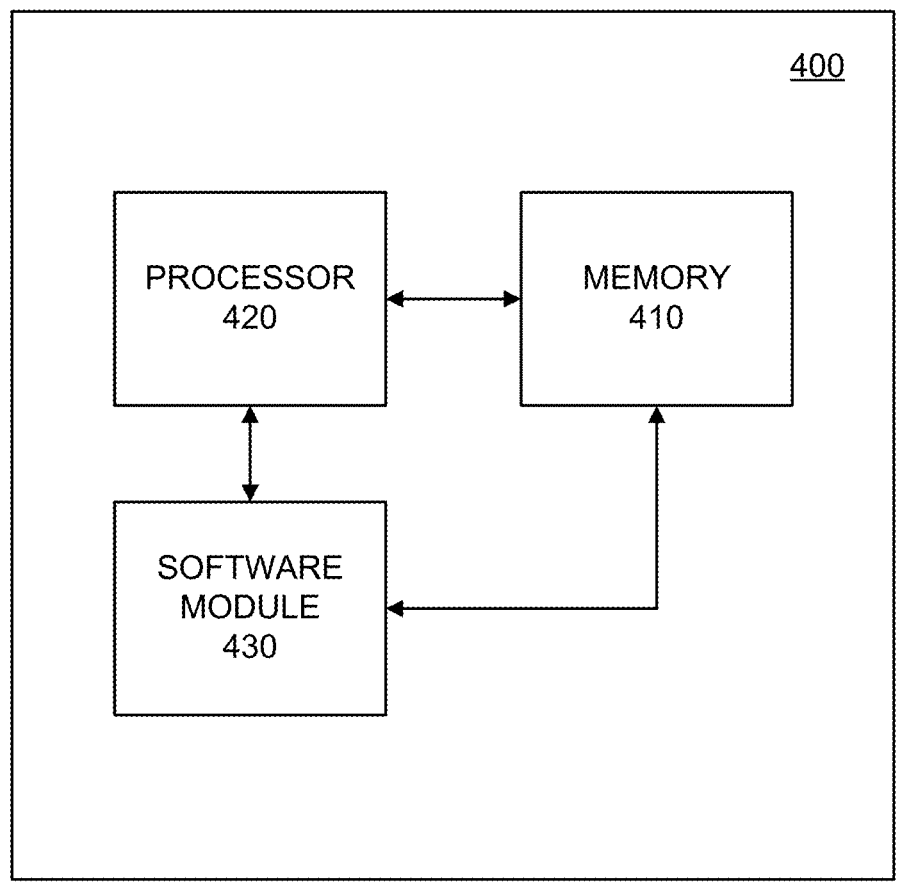
FIG. 4 illustrates an example network entity configured to store instructions and processing hardware for performing operations according to example embodiments of the present invention.

As illustrated in FIG. 4, a memory 410 and a processor 420 may be discrete components of the network entity 400 that are used to execute an application or set of operations. The application may be coded in software in a computer language understood by the processor 420, and stored in a computer readable medium, such as, the memory 410. The computer readable medium may be a non-transitory computer readable medium that includes tangible hardware components in addition to software stored in memory. Furthermore, a software module 430 may be another discrete entity that is part of the network entity 400, and which contains software instructions that may be executed by the processor 420. In addition to the above noted components of the network entity 400, the network entity 400 may also have a transmitter and receiver pair configured to receive and transmit communication signals (not shown).

Figure 5:
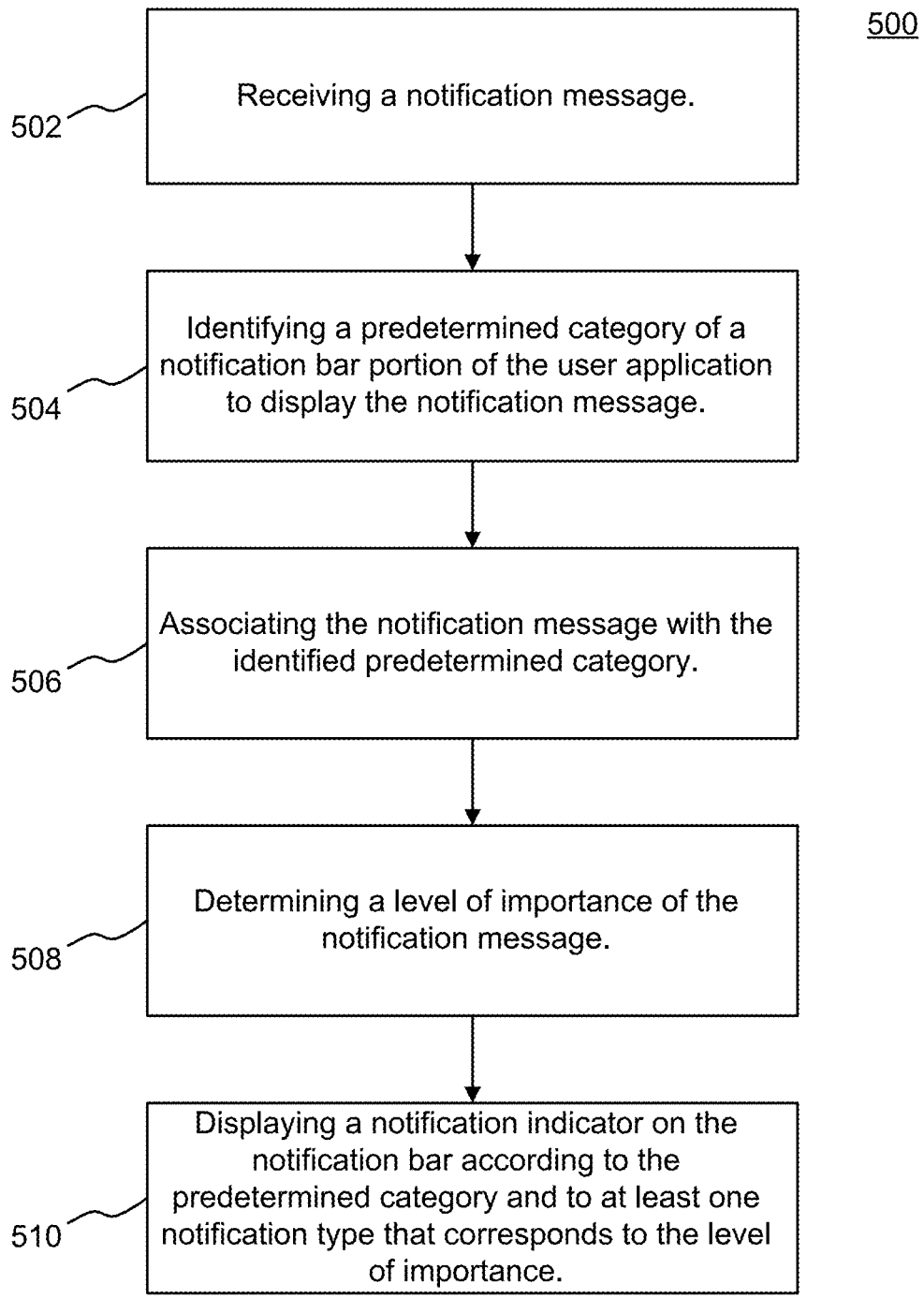
FIG. 5 illustrates an example flow diagram method of operation according to example embodiments of the present invention.

FIG. 5 illustrates an example flow diagram of a method of operation according to example embodiments. Referring to FIG. 5, the method may include providing a user application with a notification message by receiving a notification message, at operation 502. The method also includes identifying a predetermined category of a notification bar portion of the user application to display the notification message, at operation 504, and associating the notification message with the identified predetermined category, at operation 506. The method also includes determining a level of importance of the notification message, at operation 508 and displaying a notification indicator on the notification bar according to the predetermined category and to at least one notification type that corresponds to the level of importance, at operation 510.

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the systems described herein can be performed by one or more of the modules or components described herein or in a distributed architecture. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method of providing a user application with a notification message, the method comprising:
   receiving a notification message;
   identifying an initial level of importance of the notification message;
   parsing the notification message in order to identify words indicating an elevated level of importance based on natural language meanings of the words;
   in response to detecting at least one word indicating the elevated level of importance by parsing the notification message, determining the level of importance of the notification message to be the elevated level of importance; or
   in response to not detecting at least one word indicating the elevated level of importance by parsing the notification message, determining the level of importance of the notification message to be the initial level of importance;
   automatically generating an alert status notification based on the level of importance;
   identifying a predetermined category of a notification bar portion of the user application to display the notification message and using the determined level of importance to select the predetermined category of the notification bar portion and a notification type to display the notification message on the notification bar portion of the user application;
   wherein identifying the notification message as being assigned to the predetermined category of the notification bar portion is based on one or more notification statements stored in a database and wherein the predetermined category of the notification bar portion comprises a category name and display icon which are subjectively related to content of the notification message and wherein the predetermined category of the notification bar is linked to one or more portions of the notification bar; and
   displaying a notification indicator on the notification bar on the identified predetermined category of the notification bar portion via the respective identified notification type corresponding to the level of importance;
   wherein the displaying of the notification indicator corresponding to the elevated level of importance comprises:
      maintaining the display of the notification indicator for a predetermined period of time and associating the notification indicator with a predetermined automated action to resolve a condition associated with the notification message; and
      performing the predetermined automated action in response to the predetermined period of time lapsing, wherein the identified notification type comprises a flyout notification, and displaying, in a new window, the flyout notification based on the notification indicator;
   wherein the displaying of the notification indicator corresponding to the initial level of importance comprises:
   incrementing a display of a number of messages on the notification bar portion;
   displaying a flashing alert item on the notification bar portion without generating a flyout notification; and
   ceasing to display the flashing in response to a user interaction with the flashing alert.

2. The method of claim 1, wherein the notification type comprises at least one of:
   a silent notification, a subtle notification, and a flyout notification.

3. The method of claim 2, wherein the silent notification does not produce any sounds and the subtle notification does produce at least one sound based on a user defined parameter.

4. The method of claim 1, wherein the predetermined category of the notification bar portion and the at least one notification type used to display the notification message on the notification bar portion are selected based on the meaning of the at least one word.

5. The method of claim 1, further comprising matching an association of a word meaning to the elevated level of importance in order to identify the at least one word indicating the elevated level of importance in the notification message.

6. The method of claim 1, wherein the notification bar portion of the user application displays the notification indicator associated with the elevated level of importance based on the natural language meaning of the last one word.

7. The method of claim 1, wherein the notification message is a mail message or a customer ticket message.

8. An apparatus configured to provide a user application with a notification message, the apparatus comprising:
- a memory configured to store predetermined categories of a notification bar;
- a receiver configured to receive a notification message; and
- a processor configured to:
  - receiving a notification message;
  - identifying an initial level of importance of the notification message;
  - parsing the notification message in order to identify words indicating an elevated level of importance based on natural language meanings of the words;
  - in response to detecting at least one word indicating the elevated level of importance by parsing the notification message, determining the level of importance of the notification message to be the elevated level of importance; or
  - in response to not detecting at least one word indicating the elevated level of importance by parsing the notification message, determining the level of importance of the notification message to be the initial level of importance;
  - automatically generating an alert status notification based on the level of importance;
  - identifying a predetermined category of a notification bar portion of the user application to display the notification message and using the determined level of importance to select the predetermined category of the notification bar portion and a notification type to display the notification message on the notification bar portion of the user application;
  - wherein identifying the notification message as being assigned to the predetermined category of the notification bar portion is based on one or more notification statements stored in a database and wherein the predetermined category of the notification bar portion comprises a category name and display icon which are subjectively related to content of the notification message and wherein the predetermined category of the notification bar is linked to one or more portions of the notification bar; and
  - displaying a notification indicator on the notification bar on the identified predetermined category of the notification bar portion via the respective identified notification type corresponding to the level of importance;
  - wherein the displaying of the notification indicator corresponding to the elevated level of importance comprises:
    - maintaining the display of the notification indicator for a predetermined period of time and associating the notification indicator with a predetermined automated action to resolve a condition associated with the notification message; and
    - performing the predetermined automated action in response to the predetermined period of time lapsing, wherein the identified notification type comprises a flyout notification, and displaying, in a new window, the flyout notification based on the notification indicator;
  - wherein the displaying of the notification indicator corresponding to the initial level of importance comprises:
    - incrementing a display of a number of messages on the notification bar portion;
    - displaying a flashing alert item on the notification bar portion without generating a flyout notification; and
    - ceasing to display the flashing in response to a user interaction with the flashing alert.

9. The apparatus of claim 8, wherein the notification type comprises at least one of:
a silent notification, a subtle notification, and a flyout notification.

10. The apparatus of claim 9, wherein the silent notification does not produce any sounds and the subtle notification does produce at least one sound based on a user defined parameter.

11. A non-transitory computer readable storage medium configured to store instructions that when executed by a processor cause the processor to perform providing a user application with a notification message, the processor being further configured to perform:
- receiving a notification message;
- identifying an initial level of importance of the notification message;
- parsing the notification message in order to identify words indicating an elevated level of importance based on natural language meanings of the words;
- in response to detecting at least one word indicating the elevated level of importance by parsing the notification message, determining the level of importance of the notification message to be the elevated level of importance; or
- in response to not detecting at least one word indicating the elevated level of importance by parsing the notification message, determining the level of importance of the notification message to be the initial level of importance;
- automatically generating an alert status notification based on the level of importance;
- identifying a predetermined category of a notification bar portion of the user application to display the notification message and using the determined level of importance to select the predetermined category of the notification bar portion and a notification type to display the notification message on the notification bar portion of the user application;
- wherein identifying the notification message as being assigned to the predetermined category of the notification bar portion is based on one or more notification statements stored in a database and wherein the predetermined category of the notification bar portion comprises a category name and display icon which are subjectively related to content of the notification message and wherein the predetermined category of the notification bar is linked to one or more portions of the notification bar; and displaying a notification indicator on the notification bar on the identified predetermined category of the notification bar portion via the respective identified notification type corresponding to the level of importance;

wherein the displaying of the notification indicator corresponding to the elevated level of importance comprises:

maintaining the display of the notification indicator for a predetermined period of time and associating the notification indicator with a predetermined automated action to resolve a condition associated with the notification message; and performing the predetermined automated action in response to the predetermined period of time lapsing, wherein the identified notification type comprises a flyout notification, and displaying, in a new window, the flyout notification based on the notification indicator;

wherein the displaying of the notification indicator corresponding to the initial level of importance comprises:

incrementing a display of a number of messages on the notification bar portion;

displaying a flashing alert item on the notification bar portion without generating a flyout notification; and ceasing to display the flashing in response to a user interaction with the flashing alert.

12. The non-transitory computer readable storage medium of claim 11, wherein the notification type comprises at least one of:

a silent notification, a subtle notification, and a flyout notification.

13. The non-transitory computer readable storage medium of claim 12, wherein the silent notification does not produce any sounds and the subtle notification does produce at least one sound based on a user defined parameter.

* * * * *